Figure 1:
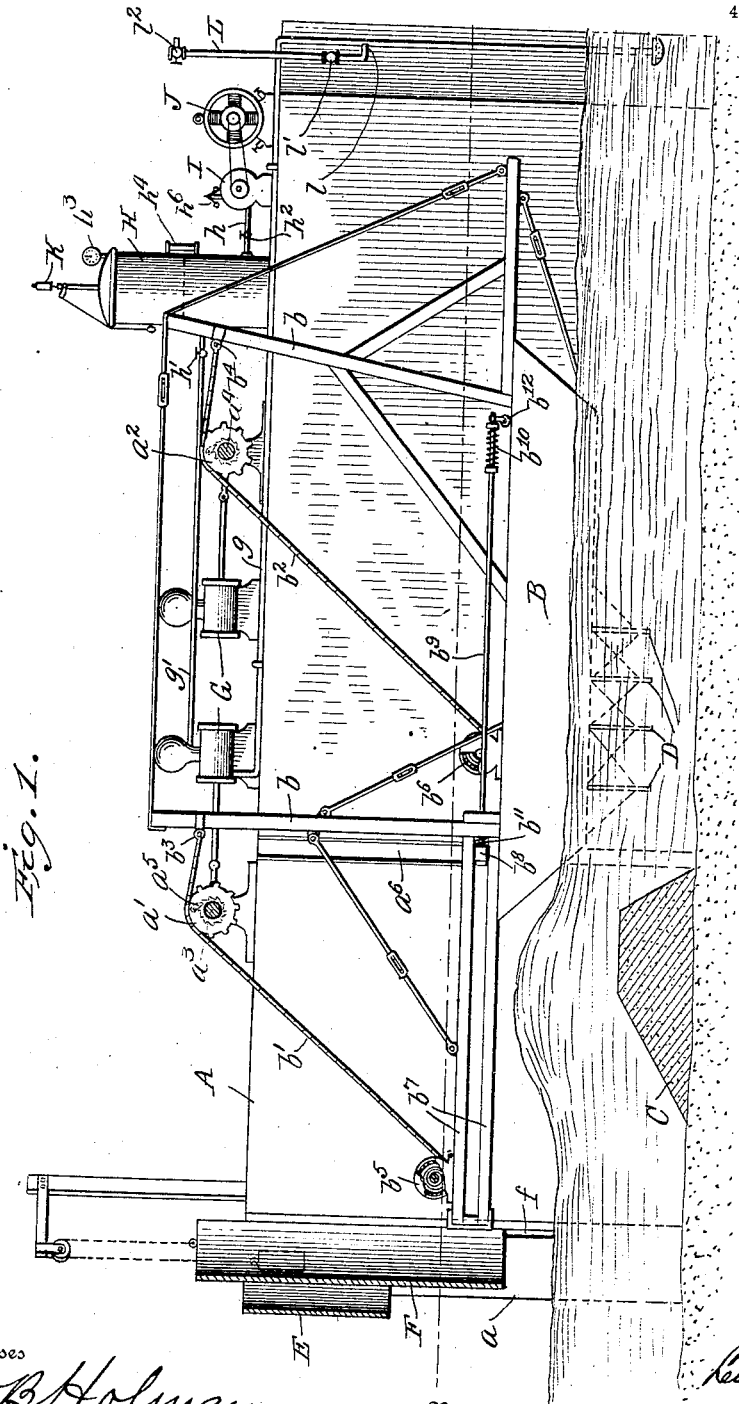

L. WOLFLEY.
WAVE POWER.
APPLICATION FILED JULY 11, 1907.

910,439.

Patented Jan. 19, 1909.
4 SHEETS—SHEET 1.

Witnesses
V. B. Holman
H. T. Williams

Inventor
Lewis Wolfley,
By
Vernon B. Prentiss,
Attorney

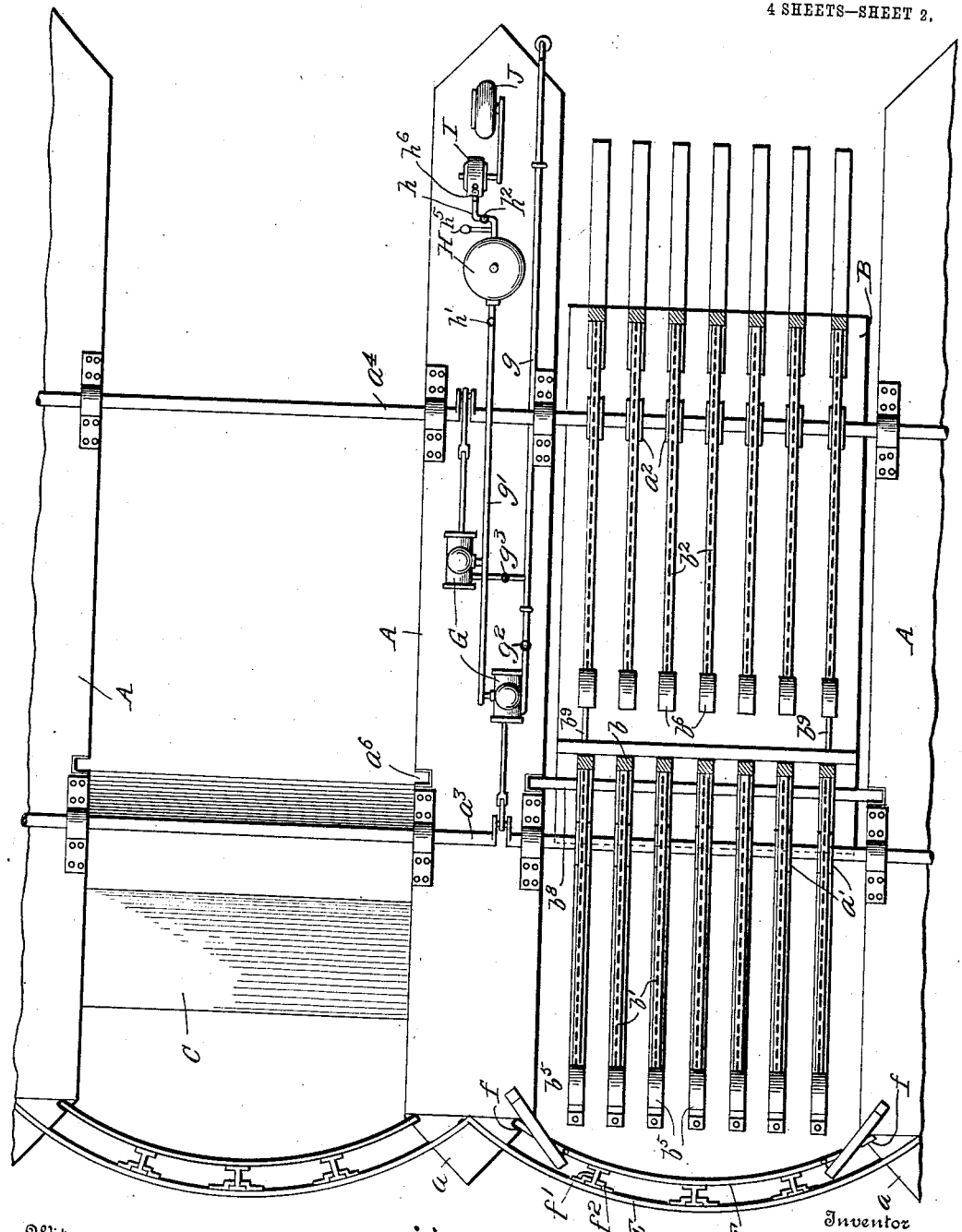

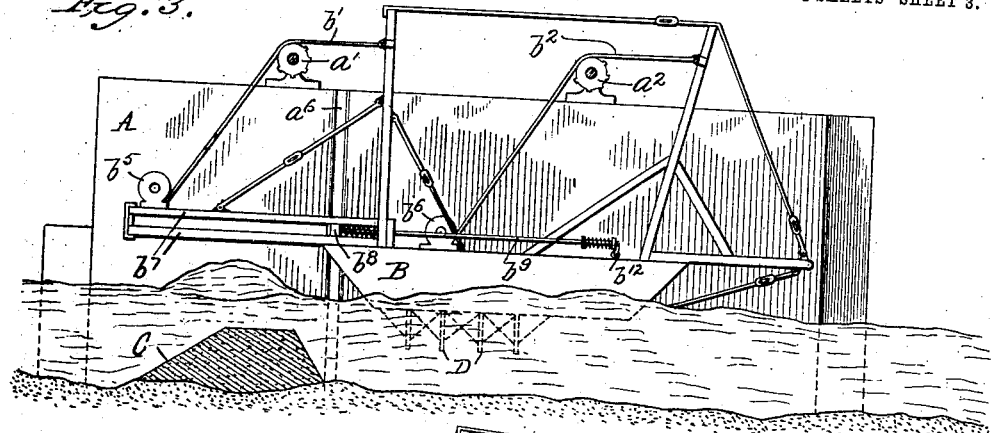
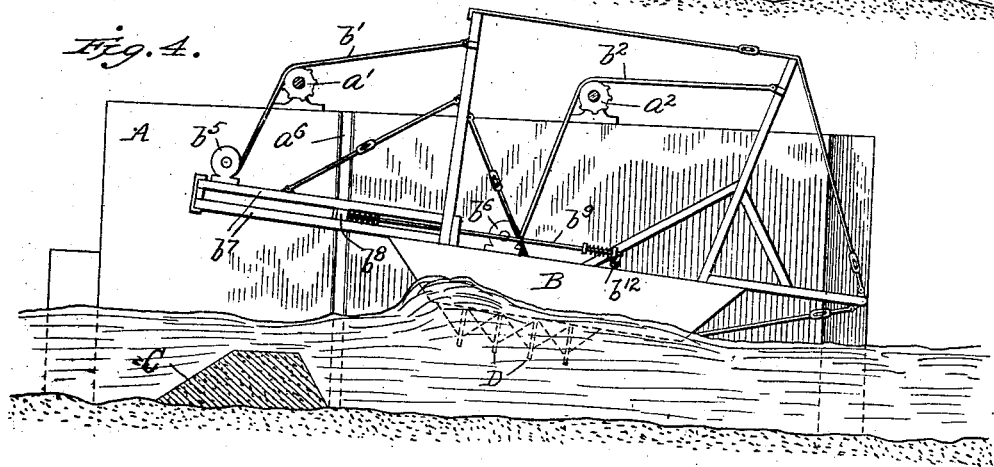
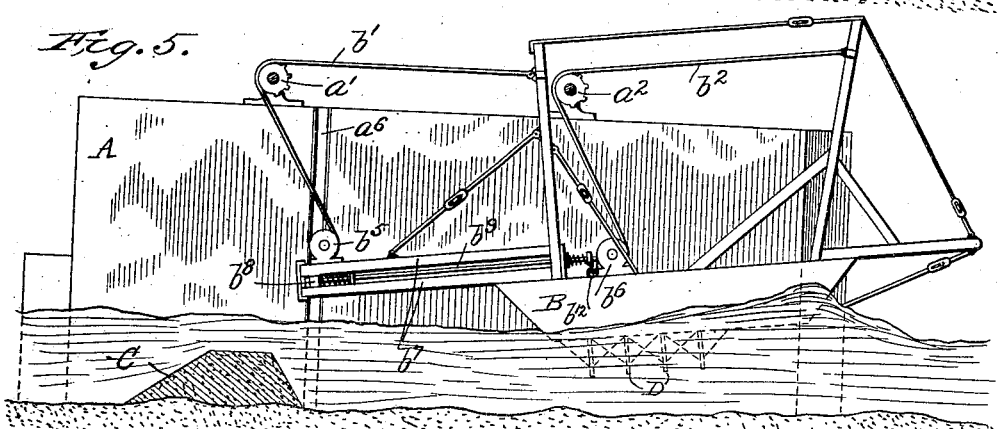

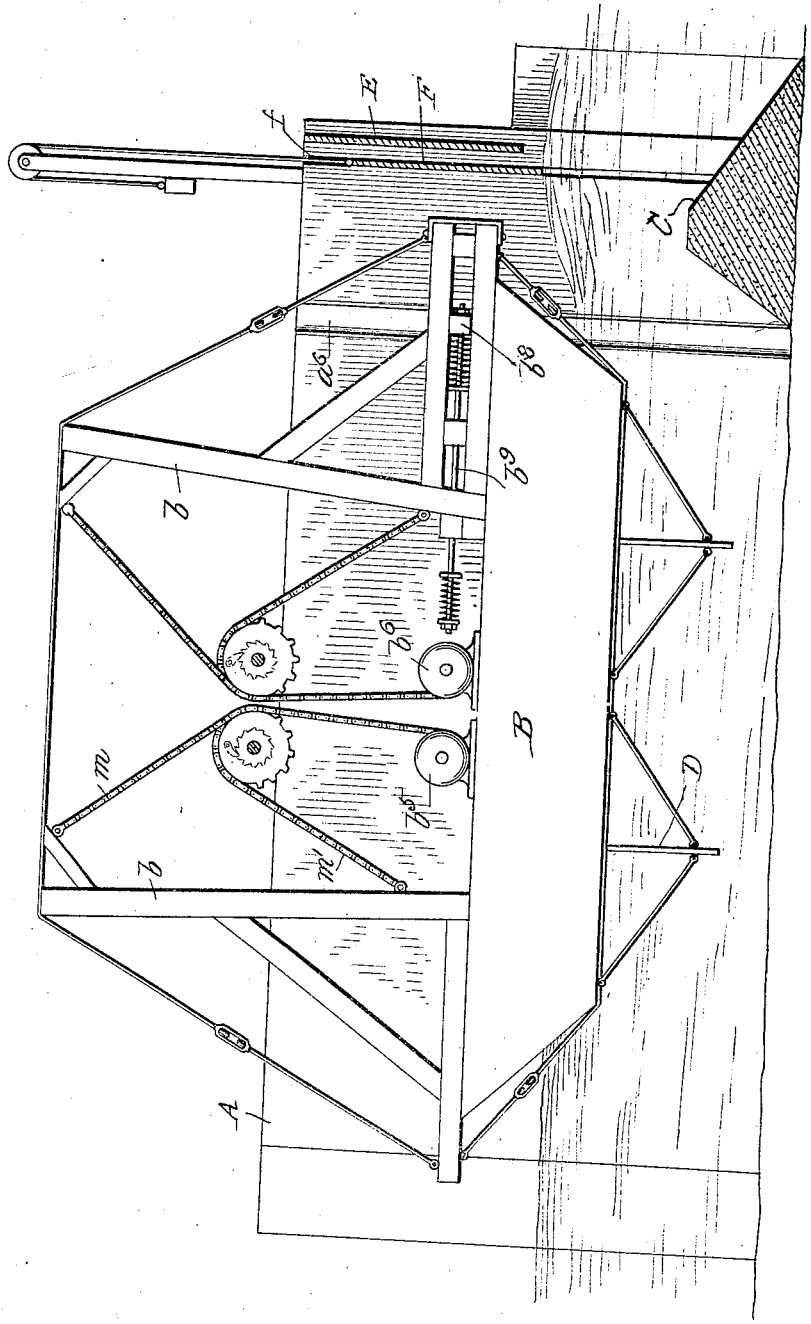

UNITED STATES PATENT OFFICE.

LEWIS WOLFLEY, OF PRESCOTT, ARIZONA TERRITORY.

WAVE-POWER.

No. 910,439.  Specification of Letters Patent.  Patented Jan. 19, 1909.

Application filed July 11, 1907. Serial No. 383,279.

*To all whom it may concern:*

Be it known that I, LEWIS WOLFLEY, a citizen of the United States, residing at Prescott, in the county of Yavapai and Territory of Arizona, have invented certain new and useful Improvements in Wave-Powers, of which the following is a specification.

My invention relates to the utilization of the wave power of the ocean and other large bodies of water, and has for its principal object the production of a system of piers, floats and accessory apparatus along the shore, that will utilize every effective motion of the waves and associated currents, and even increase their force.

This invention belongs to that class of wave motor devices in which a boat or float rests upon the surface of the water and is moved to-and-fro by the waves and currents. In carrying the invention into effect I provide a series of these floats along the shore line, arranged in inlets formed between a series of piers, each inlet being occupied, preferably, by a single float. Each float is provided with standards and stays, and to the standards are attached drive-chains which coöperate with suitable drums and shafting mounted upon the piers, to convert the motions of the floats into a regular form of motion available for driving machinery. I also provide means for protecting the floats within the inlets in case of storms, and for shutting off the waves from the inlets entirely when it is desired to discontinue operation of the wave power or to repair the floats. I also provide means for converting power generated by the motion of the floats into a form which may be readily utilized or transmitted, and for this purpose prefer to employ pressure pumps operated from the shafting driven by the floats, the pressure from these pumps being utilized in a suitable fluid pressure motor which latter, in turn, may drive an electric generator.

My invention is illustrated in accompanying drawings, in which—

Figure 1 is a side elevation of one of the floats in its operative position within an inlet and showing one of the piers upon which the power utilizing devices are mounted, the protective shields being shown in section. Fig. 2 is a plan view showing one of the floats mounted in an inlet, the braces of the standards being omitted, and an adjacent inlet without a float. Figs. 3, 4 and 5 are views similar to Fig. 1 on a reduced scale showing the float in its forward, intermediate and rearward positions under the influence of a wave, the power-transmitting apparatus being omitted. Fig. 6 is a view similar to Fig. 1 showing a modified arrangement of the drive-chains and shafting of the float through which power is transmitted.

Referring now to the drawings, the letter A represents the piers constructed in series along the shore a short distance out therefrom where the water is the proper depth. These piers may be of any preferred construction, such as masonry, concrete or cement, and there may be any number of them extending any distance desired along the shore or coast. I have shown three for the purpose of illustration. The piers have straight parallel sides extending from bottom to top, and are provided with pointed and tapered ends, $a$, to a height above high tide. These tapered ends $a$, of the piers, are for the purpose of concentrating and increasing the force of the waves and currents as they enter the inlets formed between the piers, in which inlets are located a series of boats or floats B, preferably one in each inlet. The construction of these boats or floats will be described in connection with the one illustrated, as representative of the others.

Referring now particularly to Figs. 1 and 2, it will be seen that the float is provided with two sets of uprights or standards, $b$, one set located near each end and rigidly fastened and braced. These sets may be composed of any suitable number of uprights, seven being shown, to provide rigid connection or support for the drive chains, $b^1$, $b^2$. These chains, which are shown as sprocket chains, are connected to the uprights near the upper ends thereof at $b^3$, $b^4$, and at their other ends are wound upon spring drums, $b^5$, $b^6$. The spring drums $b^5$ are mounted on the forward extension, $b^7$, of the float, and the spring drums $b^6$, are mounted upon the body of the float as shown. The drive-chains, $b^1$, $b^2$, engage power drums, shown as sprocket wheels $a^1$, $a^2$, mounted upon shafts, $a^3$, $a^4$, which extend transversely across the piers and are journaled in suitable bearings thereon. The power drums, $a^1$, $a^2$, are connected to the shafts by any suitable form of ratchet, $a^5$, by means of which the drums will drive their respective shafts when rotating in one direction, but will move idly upon the shafts when rotating in the other direction. It will be understood that other forms of drive-chains, drums, and ratchets may be substituted for those shown.

The float is anchored within the inlet by means of an anchor bar, $b^8$, which extends transversely across the forward end of the float and works between the upper and lower members of the forward extension, $b^7$. The ends of this anchor bar extend into recesses, $a^6$, of the piers and the bar moves up and down in these recesses as the float rises and falls under the influence of the waves and tide. These recesses may be faced with steel and the bar may be shod or otherwise constructed to reduce friction and wear. Slide rods, $b^9$, are provided at each side of the float passing through perforations in the anchor bar, $b^8$, and provided with end springs, $b^{10}$, $b^{11}$, to cushion the movement of the float at each end of its travel. The rearward ends of these rods $b^9$, are supported in any suitable way, as by rollers, $b^{12}$, resting on the deck of the float, or by suspending them from the piers.

In order to more effectively utilize the power of the waves and particularly to bring into use the ground swell, I employ what I term an "artificial shore line" shown at C and located a short distance within the entrance of each inlet. This consists of a ridge of concrete or other material upon the ground, and has a gradually sloping surface toward the entrance of the inlet and a more abruptly sloping surface facing the inner end of the inlet. As the waves and the ground swell advance they are concentrated by the tapered ends of the piers and are then more effectively thrown into operative engagement with the float by this artificial shore line.

In order to increase the pressure surface of the float presented to the advancing waves and current of water, I provide transverse lower extensions or fins, D, extending across the beam of the float, preferably from the forward end to the middle of the float and projecting downwardly.

The forward or seaward end of the inlet is protected by a stationary shield, E, constructed of heavy wrought iron or steel resting upon the forward tapered ends of the piers and rigidly secured in place. This shield is preferably convex-curved to present an efficient resistance to the waves and its lower edge extends to a point which will admit waves up to a desired height at high tide. High tide level is represented in Fig. 1 by a horizontal discontinuous line. Co-operating with this stationary shield is a movable shield or gate, F, suitably suspended and counter-weighted and sliding within grooves, $f$, in the piers and capable of being lowered and to shut off partially or entirely the waves from the inlet in case of storm or for permitting repairs to the float.

The movable shield or gate F is also braced by brackets $f^1$, secured thereto and working in grooves $f^2$, upon the stationary shield.

In order to utilize the power communicated to the shafts, $a^3$, $a^4$, by the ratchet drums, I preferably employ a hydraulic pressure arrangement comprising pumps, G, which may be two in number, each driven by one of the shafts. The intakes of these pumps are connected to supply pipe $g$, which may draw water from the ocean or other suitable source, and the delivery sides of the pumps are connected to delivery pipe $g^1$, which discharges into a pressure tank H. Each pump may be separately cut off from the supply pipe by a separate valve $g^2$, $g^3$, so that either pump may continue to run while the other is stopped to permit it or its shafting to be repaired. The upper portion of this pressure tank H, is filled with air to constitute an air cushion, while the water occupies the lower portion of the tank whence it is discharged through discharge pipe $h$, to the water motor I, which is belted to an electric generator J. A check valve, $h^1$, is located in the delivery pipe $g^1$, and the globe valve $h^2$, in the discharge pipe $h$. A suitable vent at the top of the pressure tank H is provided, and may be used in connection with a whistle as shown at K. A suitable pressure gage $h^3$, water glass $h^4$, safety valve $h^5$, and governor valve $h^6$, are also provided.

In order to replenish the supply of air in the upper part of pressure tank H and maintain the proper relation between the air and the water in said tank, I provide an air pipe L connected to the supply pipe $g$, at $l$, and provide it with a check valve $l^1$ and the globe valve $l^2$. When the pumps are in operation, and it is desired to increase the amount of air in the pressure tank, the globe valve $l^2$ is opened and a given amount of air is drawn in with the water by the pumps.

The operation of the apparatus as thus described will be readily understood, and is as follows: The level of the water and the various positions of the float shown in the drawings are those at low tide, the high tide water level being indicated in Fig. 1 by a horizontal discontinuous line. The movable shield or gate F being adjusted to the proper height to admit the waves and the float being in its initial position, as shown in Figs. 1 and 3, the in-rushing wave and ground swell are concentrated and directed, by the combined action of the tapered ends of the piers and the artificial shore line, against the float and the fins D, the float starting rearwardly in the inlet and its forward portion being raised. The sides of the piers being solid, and the float fitting closely, prevents spreading of the waves and consequent loss of power. By this movement of the float, the drive-chains, $b^1$, are drawn toward the rearward end of the inlet, both by a right line motion and by the elevation of the upright or standard $b$, thus rotating the power drums $a^1$, to operate the pump connected with the shaft $a^3$. At the same time the chains $b^2$, are also drawn toward the rearward end of the inlet to operate the power drums, $a^2$, and the pump connected with shaft $a^4$. This position of the float is indicated in Fig. 4. As the wave passes rearwardly in the inlet the forward end of the float falls and the rearward end is elevated, while the float still continues its motion toward the rear of the inlet and consequently the rotation of both power drums above mentioned. This position, which is the extreme position of the float within the inlet, is illustrated in Fig. 5. In this position the rearward motion is cushioned by the spring $b^{10}$ coming in contact with the stop at the base of the forward standard $b$, upon the float. The wave having passed, the float is returned to its forward position within the inlet by the outward flow of the water, and the slack of the chains is taken up by the spring drums, $b^5$ and $b^6$.

It will be observed that a float similar to float B is to occupy each inlet, and that while the power receiving and transmitting devices may be provided upon each pier, it is sufficient that they be located upon every second, third or fourth, etc., pier, as may be found expedient under local conditions.

Referring now to Fig. 6 of the drawings, in which I have shown a modification of the drive-chains and shaft connections of the float it will be seen that I provide one set of chains, $m$, attached at the upper end of the forward uprights or standards, $b$, and another set of chains, $m^1$, attached to said standards near their lower ends. This arrangement is duplicated with respect to the rearward standards or uprights, $b$, and both sets of chains with the shafting driven thereby are located between said forward and rearward standards. In this arrangement every motion of the float both in rising and falling and in moving rearwardly and forwardly is utilized.

Having described my invention, what I claim as new, and desire to secure by Letters Patent of the United States, is—

1. In a wave power, the combination with piers arranged to provide inlets therebetween, of a float reciprocally mounted within an inlet, an anchor beam movably connecting said float with said piers, and power transmitting devices operated by said float, substantially as described.

2. In a wave power, the combination with piers arranged to provide inlets therebetween, of a float reciprocally mounted within an inlet, an anchor beam extending across said inlet, and sliding in channels in said piers, guides upon said float engaging said anchor beam, and power transmitting devices operated by said float, substantially as described.

3. In a wave power, the combination with piers arranged to provide inlets therebetween, of a float reciprocally mounted within an inlet, an anchor beam extending across said inlet and sliding in channels in said piers, guides upon said float engaging said anchor beam, guide rods slidingly connecting said float and anchor beam and preventing lateral movement of the former, and power transmitting devices operated by said float, substantially as described.

4. In a wave power, the combination with piers arranged to provide inlets therebetween, of a float reciprocally mounted within an inlet, an anchor beam movably connecting said float with said piers, means for cushioning said float at the forward and rearward ends of its travel, and power transmitting devices operated by said float, substantially as described.

5. In a wave power, the combination with piers arranged to provide inlets therebetween, of a float reciprocally mounted within an inlet, an anchor beam extending across said inlet and sliding in channels in said piers, guides upon said float engaging said anchor beam, guide rods slidingly connecting said float and anchor beam and preventing lateral movement of the former, and springs upon said guide rods to cushion the float at the ends of its travel, and power transmitting devices operated by said float, substantially as described.

6. In a wave power, the combination with piers arranged to provide inlets therebetween of a float reciprocally mounted within an inlet, power shafts journaled upon said piers and extending over said inlet, power drums upon said shafts, a set of uprights rigidly mounted near each end of said float, and flexible driving connections between said power drums and the upper portions of said uprights, substantially as described.

7. In a wave power, the combination with piers arranged to provide inlets therebetween, of a float reciprocally mounted within an inlet, power shafts journaled upon said piers and extending over said inlet, ratchet drums upon said shafts, a set of uprights rigidly mounted near each end of said float, and flexible connections engaging said ratchet drums rigidly attached to said uprights and yieldingly attached to the float, substantially as described.

8. In a wave power, the combination with adjacent piers having straight solid sides and arranged to provide inlets therebetween, of floats closely fitting said inlets and mounted for reciprocating motion to-and-fro longitudinally therein, and power transmitting devices operated by said floats, substantially as described.

9. In a wave power, the combination with piers arranged to provide inlets therebetween, of a float reciprocally mounted in an inlet and transverse fins extending downwardly from said float, substantially as described.

10. In a wave power, the combination with piers arranged to provide inlets therebetween, of a float mounted for reciprocating to-and-fro-movement within an inlet and floating upon the water therein, and means arranged on the bottom of said inlet to deflect the ground swell upwardly against said float, substantially as described.

11. In a wave power, the combination with piers arranged to provide inlets therebetween, of a float mounted for reciprocating to-and-fro movement within an inlet and floating upon the water therein, and an artificial shore line or deflector near the entrance on the bottom of said inlet arranged to deflect the ground swell upwardly against said float, substantially as described.

12. In a wave power, the combination with piers having tapered ends and arranged to provide inlets therebetween, of a float mounted for reciprocating to-and-fro movement within an inlet and floating upon the water therein, and means arranged on the bottom of said inlet for deflecting the ground swell upwardly to combine with the surface swell concentrated by the tapered ends of said piers, substantially as described.

13. In a wave power, the combination with piers arranged to provide inlets therebetween, of a float mounted within an inlet, and shielding means mounted upon piers across the entrance of said inlet to limit or exclude waves, substantially as described.

14. In a wave power, the combination with piers arranged to provide inlets therebetween, of a float mounted within an inlet, and a shield adjustably mounted across the entrance of said inlet to limit the admission of waves to, or exclude them from, said inlet, substantially as described.

15. In a wave power, the combination with piers arranged to provide inlets therebetween, of a float mounted within an inlet, a shield fixed across the entrance of said inlet and adapted to exclude waves of abnormal height therefrom, and a second shield adjustably mounted to partially or wholly exclude waves from said inlet, substantially as described.

16. In a wave power, the combination with a series of piers arranged to provide inlets therebetween, of floats reciprocally mounted for to-and-fro movement longitudinally and to receive direct wave impact within said inlets, power shafts journaled upon said piers and extending over a plurality of said inlets, and driving connections between a plurality of said floats and said power shafts, substantially as described.

17. In a wave power, the combination with piers arranged to provide inlets therebetween, of a float operatively mounted within an inlet, power shafting journaled upon said piers, driving connection between said float and shafting, a pressure reservoir, a pump operated from said shafting and discharging into said reservoir, a liquid supply connection for the intake side of said pump, and a valve controlling the admission of air to said liquid supply connection, substantially as described.

In testimony whereof I have affixed my signature in presence of two witnesses.

LEWIS WOLFLEY.

Witnesses:
M. E. SPAULDING,
EMMA CHURCH.